No. 649,295.  
L. G. GARCIA.  
ACCUMULATOR.  
(Application filed Dec. 11, 1897.)  
Patented May 8, 1900.
(No Model.)  
2 Sheets—Sheet 1.
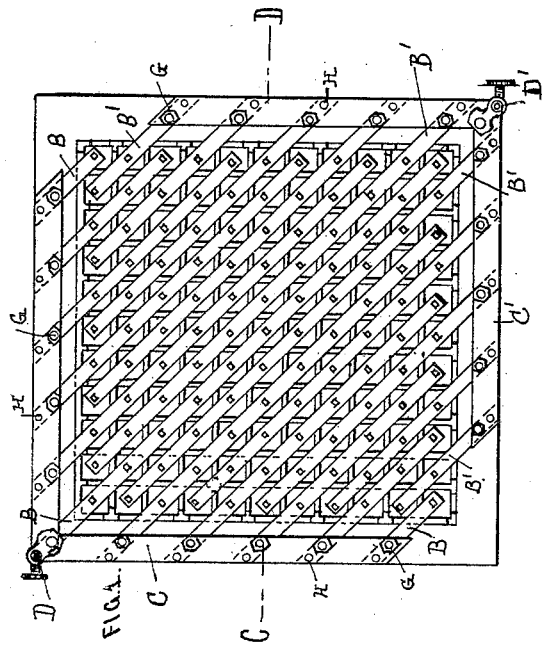
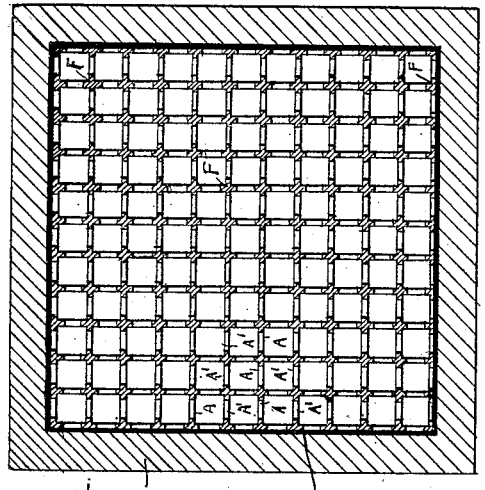
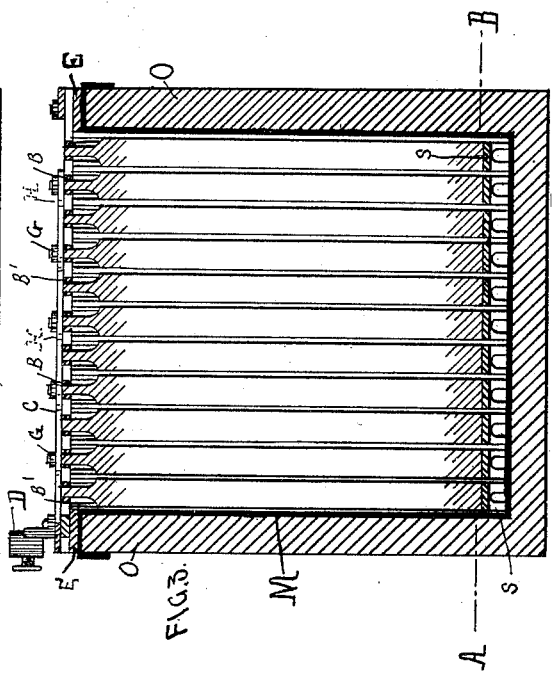
WITNESSES:  
F. W. Wright,  
S. C. Connor
INVENTOR  
LUIS GUMIEL GARCIA  
BY  
Horwar and Hawley  
ATTORNEYS.

No. 649,295.
L. G. GARCIA.
ACCUMULATOR.
(Application filed Dec. 11, 1897.)
Patented May 8, 1900.
(No Model.)
2 Sheets—Sheet 2.
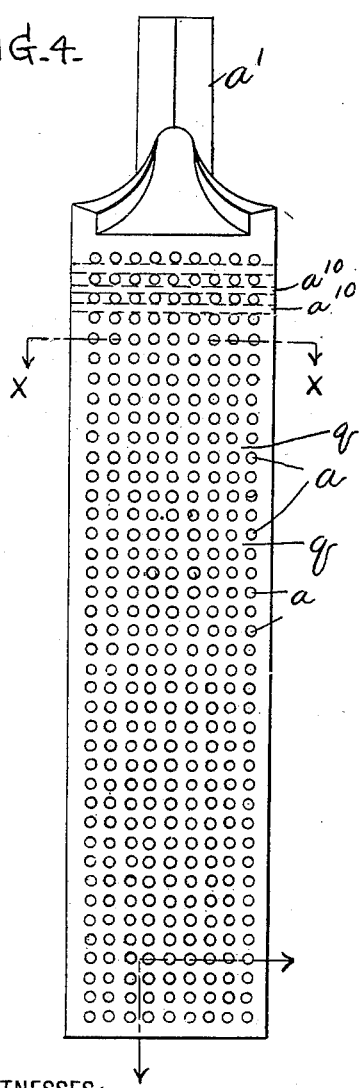
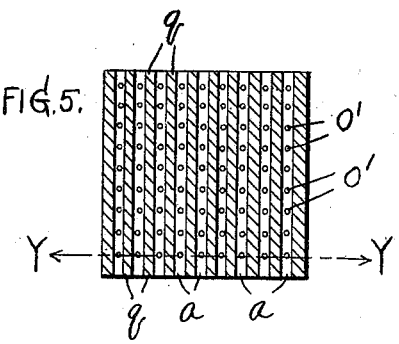
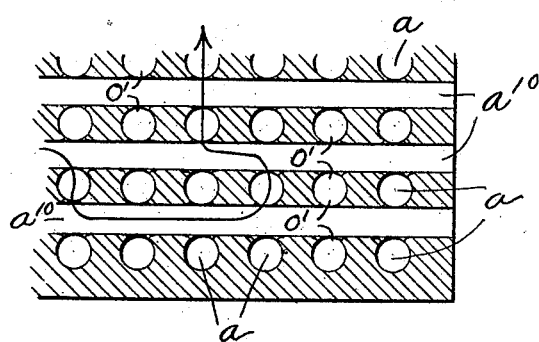
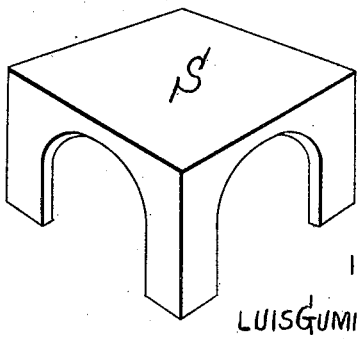
WITNESSES:
F. W. Wright.
J. C. Connor.
INVENTOR
LUIS GUMIEL GARCIA
BY
Howson and Howson
HIS ATTORNEYS

UNITED STATES PATENT OFFICE.

LUIS GUMIEL GARCIA, OF ASPE, SPAIN.

ACCUMULATOR.

SPECIFICATION forming part of Letters Patent No. 649,295, dated May 8, 1900.

Application filed December 11, 1897. Serial No. 661,474. (No model.)

*To all whom it may concern:*

Be it known that I, LUIS GUMIEL GARCIA, a subject of the King of Spain, and a resident of Aspe-Alicante, in the Kingdom of Spain, have invented Improvements in Accumulators, of which the following is a specification.

This invention relates to an accumulator or storage battery; and it consists of improvements in the construction of the electrodes, which consist of bars of lead of prismatic shape with a square base arranged vertically and parallel to each other, so as to have between them narrow spaces formed by the interposition of small ebonite rods of cross-shape section, the angles of which fix the position of the electrode. The lead bars (electrodes) are provided with a series of small orifices placed in parallel and horizontal rows and connecting the opposite faces of the prisms throughout the whole height or depth of the same. All these orifices are also connected with the orifices immediately above and below them. Each of the electrodes is provided at its upper end with a rod which is embedded in small antimonious lead bars which in their turn are connected with two main collectors, (also constructed of antimonious lead,) one of which corresponds to the positive electrodes and the other to the negative electrodes. It goes without saying that owing to the arrangement of the electrodes the negative and positive series become connected along diagonal lines, as will be seen by the description given below with reference to the drawings. The great firmness of the complete arrangement and the surface it presents in a small compass, also the fact that the electrodes may be relied upon not to become disconnected, owing to the rigidity and resistance of the parts, whereby harmful contacts are avoided, are further advantages of the improved storage battery.

The invention will be best understood by reference to the accompanying drawings, in which—

Figure 1 is a plan, and Fig. 2 a section, on line A B, Fig. 3; Fig. 3, a section an line C D, Fig. 1; and Fig. 4 is a side elevation of a single electrode. Fig. 5 is a section of an electrode on the line X X, Fig. 4. Fig. 6 is an enlarged sectional elevation of a portion of Fig. 4 bounded by the right-angled lines and arrow and taken on the line Y Y of Fig. 5, and Fig. 7 is a perspective view of one of the arched blocks on which each electrode rests.

My accumulator or storage battery consists of a wooden case of prismatic shape with a square base lined with lead M, which lining extends beyond the edges of the case O, as will be seen in Fig. 3. At the bottom of this case there are supports $s$, of porcelain, ebonite, or any other insulating and resistant substance, which, as will be seen in Fig. 3, are intersected by cylindrical archways, so that there is left at the bottom of the case a chamber sufficient for the sediments, which necessarily will be very slight, owing to the arrangement of the material in the electrode. Upon these supports there are placed the rods A A', separated by small rods F, Fig. 2, of ebonite, which extend from the bottom of the case to the base of the small collecting-rods B B', Figs. 1 and 3, and form spaces of about two millimeters. The electrodes, as will be seen from the detailed view Fig. 4, each consist of a bar of lead of prismatic shape and square at the base and having a connecting-rod $a'$, which terminates each electrode and is properly strengthened, as may be seen from the drawings.

Each individual electrode is formed with a great number of channels or perforations $a$, extending from one side of the electrode through to the other. Each of these channels I prefer to make one millimeter in diameter. I arrange them in regular rows, leaving a space $q$ between each pair of rows a millimeter wide. I also provide, alternating with the above rows, another series of perforations $a^{10}$, extending through the electrode at right angles to the first channels, of the same diameter and arrangement as the first. Each set of channels $a^{10}$ will thus be tangential to the adjacent channels $a$ above and below it and leave communicating openings O', as shown by the arrow in Fig. 6. By this arrangement I secure a complete honeycombed electrode of regular shape. To form this electrode, I may cast the metal around rods placed in rows at right angles and tangential with the rods above and below them, as will be readily understood.

The connection of electrodes of the same polarity is insured by a homogeneous solder jointing its rods with the small collecting-bars B and B', (B being the positive and B' the negative bar,) as shown in the horizontal plan in Fig. 1. These bars in their turn are connected to one of the angular bars C and C', Fig. 1, (which, as in the foregoing arrangement, are made of antimonious lead,) constituting the main collectors, one of which is positive and the other negative. The connection with these bars is effected by means of a set-screw G and a homogeneous joint, so as to insure better contact through the medium of the rod inserted at the extremity of the small collecting-bars B and B', as will be seen at H in the same horizontal plan, Fig. 1.

In each angle of the large collectors C and C' there exists, as may be arranged, a binding screw or post D D', into each of which corresponding conductors are introduced. As will be seen from the section Fig. 3, all the small collecting-bars B and B' rest upon a crystal frame or stand E, which is in its turn secured to the edges of the case, the object of this arrangement being to obtain perfect insulating for these collectors.

The electrolytic liquid employed in my storage battery is water acidulated with sulfuric acid at 66°, being ten-per-cent. solution, and the operation of the battery is the same as that of other batteries of the same kind.

The complete apparatus is particularly advantageous in regard to the time taken up in charging the battery, whereby a great economy in the consumption of active material is realized.

I claim as my invention—

1. The herein-described electrode for accumulators, consisting of a bar having perforations, some of which run in one direction and others in another direction, but in a plane parallel with the first, and openings O' forming communications between the sets of perforations.

2. The herein-described electrode for accumulators consisting of a bar having perforations of curved cross-sections arranged in rows with the perforations of alternate rows at right angles to each other and each row tangential to the adjacent rows above and below it, as and for the purpose described.

3. The herein-described electrode for accumulators, consisting of a bar having perforations arranged in rows, with the perforations of alternate rows at right angles to each other, each perforation having at least as great a diameter as the distance between the nearest pair of rows which are parallel with each other, as and for the purpose described.

4. The herein-described accumulator having a number of electrodes consisting of vertical perforated prismatic bars, an inclosing box and an arched support under each electrode, such support having openings crossing each other, substantially as described.

5. An accumulator, comprising a series of perforated prismatic bars, insulating-rods spacing the bars, an inclosing box, diagonal connecting-plates at the tops of the rods and corner-pieces on the box to which the alternate plates are connected, substantially as described.

In testimony whereof I have signed my name to this specification in the presence of two subscribing witnesses.

LUIS GUMIEL GARCIA.

Witnesses:
JOSÉ BERGÁN,
SANTIAGO CANTÓ.